UNITED STATES PATENT OFFICE.

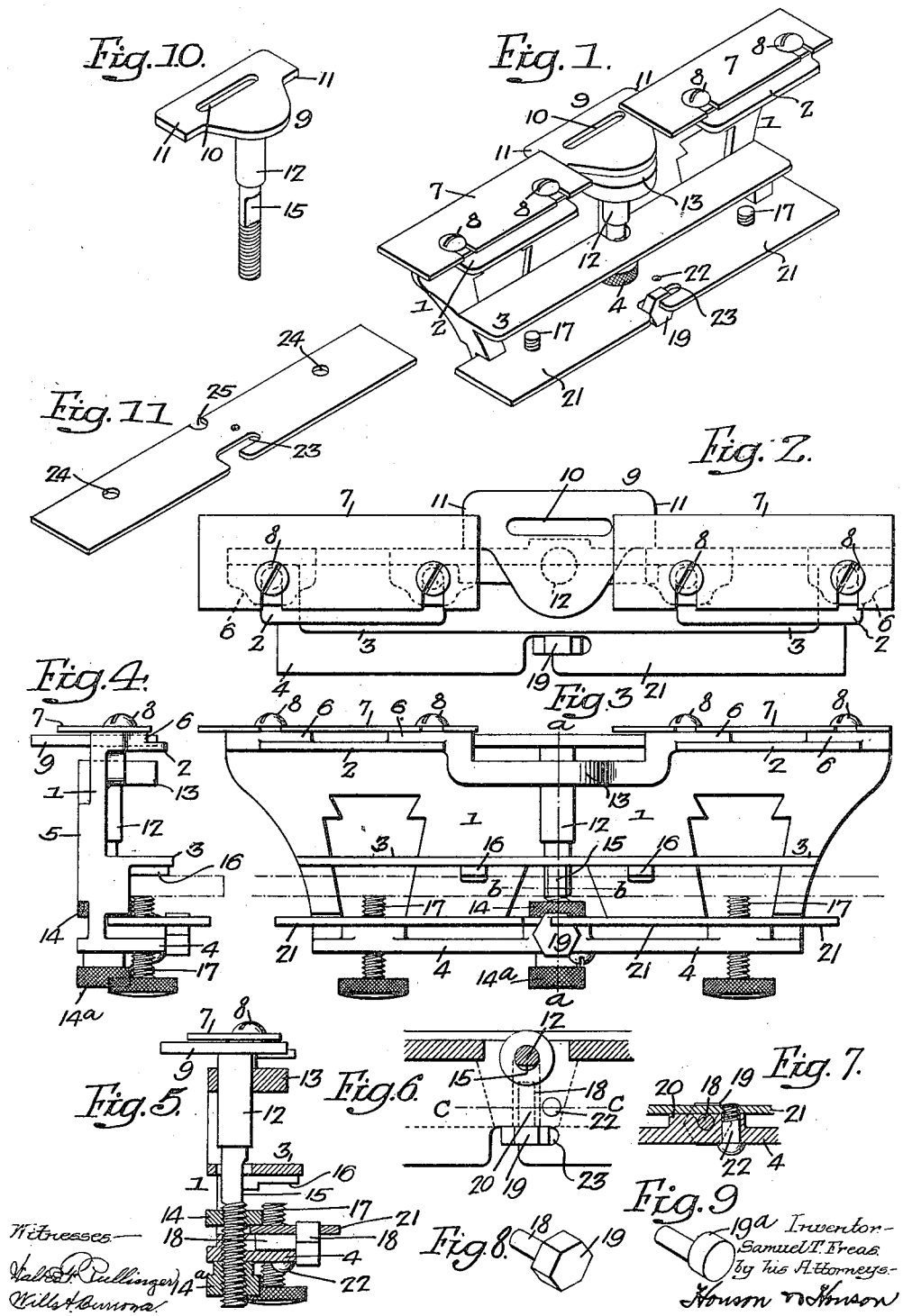
S. T. FREAS.
CROSSCUT SAW TOOL.
APPLICATION FILED JUNE 20, 1914.
1,204,264.
Patented Nov. 7, 1916.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

CROSSCUT-SAW TOOL.

1,204,264.  Specification of Letters Patent.  Patented Nov. 7, 1916.

Application filed June 20, 1914. Serial No. 846,348.

*To all whom it may concern:*

Be it known that I, SAMUEL T. FREAS, a citizen of the United States, and a resident of Trenton, in the county of Mercer, State of New Jersey, have invented certain Improvements in Crosscut-Saw Tools, of which the following is a specification.

My invention relates to certain improvements in tools for setting and fitting cross cut saw teeth so that they can be properly sharpened and filed.

Cross cut saws are usually made with cutting teeth and with what are known as "raker" teeth, which clean the kerf after the cutting teeth have made the cut.

The object of my invention is to design a tool of this character so that the raker teeth may be properly filed and swaged and to provide means for holding the file so as to reduce the height of the cutting teeth, and also to provide a gage for regulating the height of the raker teeth.

In the accompanying drawings: Figure 1 is a perspective view of my improved cross cut saw tool; Fig. 2 is a plan view; Fig. 3 is a side view; Fig. 4 is an end view; Fig. 5 is a transverse sectional view on the line $a$—$a$, Fig. 3; Fig. 6 is a sectional plan view on the line $b$—$b$, Fig. 3; Fig. 7 is a sectional view on the line $c$—$c$, Fig. 6; Fig. 8 is a perspective view of the eccentric gage pin, showing the many sided head; Fig. 9 is a view of a modification of the gage pin; showing the head made in the form of an eccentric; Fig. 10 is a perspective view of the raker gage; and Fig. 11 is a perspective view of the clamp and gage plate which holds the gage pin in position.

Referring to the drawings, 1 is the frame of the tool having three integral flanges 2, 3, and 4, projecting from one side. The rear of the frame has projecting ribs 5 so that a saw can be placed against the ribs and held in proper alinement. The upper flange is divided into two sections and on each section are projections 6, which are trued so as to receive the hardened steel gage plates 7 which are slotted, as shown in Fig. 1, and fit over the shanks of screws 8 which rigidly confine these plates to the frame. The plates overhang the rear of the frame, as illustrated in Fig. 4.

Located between the two sections of the upper flange is the raker gage 9, made as shown in Fig. 10, having a slot 10 and projecting ends 11 which bear upon the rear of the frame, as shown. The spindle 12 on this raker gage passes through an opening in the portion 13 of the frame and through an opening in the second flange 3. The lower portion of the spindle is threaded for the reception of adjusting nuts 14 and $14^a$, one above and one below the flange 4. By turning the nut 14 the gage can be raised and lowered to the degree desired.

The file used in filing the cutting edge of the saw is held between the projections 16 on the flange 3 and the set screws 17, which extend through threaded openings in the flange 4. The file projects beyond the flange 3, as shown by dotted lines Fig. 4, and when the tool is inverted it can be used to file the ends of the cutting teeth of the saw. This jointer file has a slight curve which insures a quick and direct action on the teeth.

In order to provide a gage for regulating the height of the raker teeth after they have been swaged, I provide a pin 18, which has an eccentric head 19, preferably in the form of a hexagon, but which may be made as a true eccentric, as illustrated at $19^a$, Fig. 9. This pin is adapted to a bearing 20 in the lower flange 4 and is clamped to the bearing by the plate 21 by means of a screw 22, which extends through the bearing and into the threaded opening in the plate so that on turning the screw the plate 21 is drawn tightly onto the pin, holding it rigidly in position. The head projects through a slot 23 in the plate 21 a given distance, according to which surface of the pin is turned. The plate has openings 24 for the passage of the screw 17 and this screw keeps the plate in proper alinement, but the plate is rigidly held to the lower flange by the screw 22, above referred to. The plate is notched at 25 to allow the spindle 12 of the raker gage to clear it and the upper adjusting nut 14 rests on the plate. Thus it will be seen that when it is desired to set the raker gage, all that is necessary is to manipulate the two nuts on the spindle 12, which will raise the lower gage to the desired extent. When it is necessary to clamp a jointer file in the tool it is placed against the under side of the flange 3 and the clamp screws 17 are turned so as to hold the file firmly in position and the abutments 16 are so situated in relation to the screws that the file will have a slight curve.

If the jointer teeth have a given relation, after swaging, to the cutting teeth, the eccentric gage pin can be turned so that the head will project a given distance beyond the plate 21, after which it is set and the height of the raker teeth can be quickly ascertained.

I claim:

1. The combination in a cross cut saw tool, of a frame; two gage plates spaced apart and mounted on the frame; a raker gage having a slot therein for the raker teeth and having a round spindle mounted in the frame; nuts on the spindle for longitudinally adjusting and locking the raker gage in position, said raker gage having projections at each end extending under the gage plates and bearing against the rear of the frame so as to hold the gage in proper alinement and to prevent it from turning.

2. The combination in a cross cut saw tool, of a frame having a flange and having a bearing in the flange; a plate resting above the flange and slotted; a gage pin mounted in the bearing and arranged to be clamped by the plate, said gage pin having an eccentric head which projects through the slot in the plate so that, on turning the pin, the head can project to a greater or less extent in order to act as a height gage for the raker teeth.

In testimony whereof, I have signed my name to this specification in the presence of two subscribing witnesses.

SAMUEL T. FREAS.

Witnesses:
   E. B. ROBERTS,
   W. C. BURKHOLDER.

Copies of this patent may be obtained for five cents each, by addressing the "Commissioner of Patents, Washington, D. C."